United States Patent [19]
Hutt et al.

[11] Patent Number: 5,717,450
[45] Date of Patent: Feb. 10, 1998

[54] DATA-RECORDAL USING FIBRE LASERS

[75] Inventors: Kenneth West Hutt, Essex; Laurence John Robinson, Bassingbourn, both of England

[73] Assignee: Imperial Chemical Industries PLC, London, England

[21] Appl. No.: 382,001

[22] PCT Filed: Aug. 19, 1993

[86] PCT No.: PCT/GB93/01760

§ 371 Date: Apr. 21, 1995

§ 102(e) Date: Apr. 21, 1995

[87] PCT Pub. No.: WO94/04365

PCT Pub. Date: Mar. 3, 1994

[30] Foreign Application Priority Data

Aug. 20, 1992 [GB] United Kingdom .................... 9217705

[51] Int. Cl.[6] ........................................................ B41J 2/47
[52] U.S. Cl. ........................................................ 347/232
[58] Field of Search ........................................ 347/232, 238, 347/241, 256

[56] References Cited

U.S. PATENT DOCUMENTS 5,151,714  9/1992  Okino et al. ...................... 347/232

*Primary Examiner*—Mark J. Reinhart
*Attorney, Agent, or Firm*—Alix, Yale & Ristas, LLP

[57] ABSTRACT

A fibre laser (2) is used in data-recordal, such as dye diffusion thermal transfer printing. The fibre laser output (3) is modulated and scanned across a recording medium (4) of adjacent dye donor and receiver ribbons by a modulator (20) and galvanometer (16), so that an image is produced line-by-line in the medium (4) as it passes between spools (19). The fibre laser (2) may comprise a single-mode, neodymium-doped lasing core (5), a multimode pump core (6), an outer cladding (7), and a dichroic mirror (8) at each end, and may be pumped by beams (10) from laser diodes (9) coupled to the pump core (6) by optical fibres (11) and a lens (14). Instead of using a galvanometer (16), the output end of the fibre laser (2) may be moved itself across the recording medium (4), and/or a plurality of the fibre lasers (2) may be bundled together in a one or two dimensional array.

20 Claims, 4 Drawing Sheets cell # DATA-RECORDAL USING FIBRE LASERS

BACKGROUND OF THE INVENTION

1. Field of the Invention

The present invention relates to methods and apparatus for data-recordal (which term includes printing) using a laser beam, and relates especially, though not exclusively, to dye thermal transfer printing.

2. Description of the Prior Art

In dye thermal transfer printing, heat is applied to selected pixel areas of a dyesheet to cause dye to transfer to an adjacent dye receiver sheet to form a print.

Print speed is determined by the dye transfer rate which depends on the power of the heat source, and print resolution is determined by the spot size to which the source is able to be focused. For high speed and high resolution printing, therefore, a source of high radiance is required, and lasers have proved attractive.

Many different laser sources have been used, each having their own particular problems. For example, Nd:YAG lasers pumped by arc lamps suffer from being large, expensive, and inefficient, and require regular maintenance due to the short life of the lamps. Replacing the arc lamps by arrays of laser diodes can improve the size and performance of such lasers, but they remain expensive and somewhat inefficient.

Laser diodes may also be used as sources themselves, but produce highly divergent and asymmetrical beams of relatively low radiance.

SUMMARY OF THE INVENTION

The present invention aims to provide data-recordal apparatus having an alternative and advantageous laser source to those provided to date, and, from a first aspect, provides apparatus in which data-recordal is effected by a laser beam, wherein a fibre laser is provided as a laser beam source.

A fibre laser comprises, in essence, an optical fibre whose core (normally silica) is doped by a material suitable for causing lasing action (normally a rare earth metal, such as neodymium or erbium), and in which a resonant cavity is produced by, for example, providing dichroic mirrors at the fibre input and output ends to provide feedback gain at the lasing wavelengths, whilst allowing pump light to be launched into the fibre input end and laser light to be emitted from the output end. As discussed in more detail below, the preferred form of the fibre laser is of a dual core type having an inner lasing core surrounded by a pump core which, in turn, is surrounded by an outer cladding. Preferably, the lasing core is doped with neodymium.

The fibre laser may be pumped by any convenient source, such as a laser diode or laser diode array, which may be end-coupled to the fibre laser by intermediate fibre optics or by geometrical multiplexing using appropriate multiplexing optics. Fibre coupling is simpler, and the fibre outputs may be butt coupled or imaged onto the fibre laser end. Where the fibre laser is dual core, the pump light is coupled into the pump core, and the lasing core is effectively side-pumped as the pump light travels down the pump core.

Fibre lasers have a number of significant advantages over prior art sources. They are less expensive than traditional solid-state Nd:YAG lasers, because it is far easier to fabricate a glass fibre than to grow a YAG crystal. Further, the efficiency of the fibre laser is greater, because the laser light is confined substantially to the fibre core, and so there is minimal sideways loss.

Moreover, when the fibre laser is end-pumped, the pump light is also confined to the core, and may be reflected back and forth by the mirrors, thereby allowing absorption of the pump light to take place during multiple passes of the light along the length of the fibre, and so increasing the source efficiency still further.

Another advantage of the present invention is that the fibre laser length, and thus the lasing core length and pump light path, may be set to suit desired power output and efficiency requirements, and the fibre laser may be coiled to provide a compact configuration easily locatable in what may be the restricted space of a printer.

A special advantage in the context of data recordal, and in particular printing, is that a fibre laser may follow a tortuous path, be mounted in a simple manner in common with standard optical fibres, and the beam output end may be easily adjusted to face in a desired direction. Therefore, beam delivery is simplified, and beam alignment is easily controlled. Thus, the fibre laser itself may conveniently deliver a high quality output beam directly to a desired location within a printing apparatus whilst being pumped by a low cost and compact laser source such as a diode or diode array (which by itself only provides a low quality beam). The possible need for a downstream delivery fibre and associated coupling optics in a print engine which uses conventional laser sources (which can add to the cost and complexity, and cause beam degradation) may be avoided.

The light output from the fibre laser may be directed onto a recording medium in a known manner, and, in one preferred embodiment, the fibre laser is held stationary, and its output delivered to and scanned across a recording medium by optical transfer and scanning elements, such as mirrors, rotating polygons, and collimating and focusing lenses.

In another embodiment, the output end of the fibre laser itself is moved, for example, back and forth, to provide the scanning action. In this arrangement, the fibre laser output may be delivered and focused onto the recording medium by separate transfer and focusing optical elements, as above. These elements would, however, then need to be quite large to ensure that they encompassed the full sweep of the scanned beam. In a preferred embodiment, therefore, the output end of the fibre laser is arranged directly to face the recording medium, and has focusing optics mounted thereon. This allows the optics to be small in size, and, as they are mounted on the fibre laser end, ensures that they are always correctly aligned with the fibre laser output. The fibre laser is preferably moved so that its output beam scans in a flat plane, rather than in a curved plane (as is produced by a scanning mirror), and so no corrective flat field optics are needed.

In a further embodiment, a plurality of fibre lasers may be used, and their output ends bundled together into a closely packed array. The beams from such an array may scan in any of the ways described above, or alternatively may be held stationary and instead the recording medium be transversely moved in relation to them. As a variation on this, the array may be two-dimensional and cover the whole printing region so that no scanning is required.

The output beam of the fibre laser will normally need to be modulated to be either fully on or fully off, or to have a range of power outputs in between these states. This may be achieved, for example, by modulating the pump source, such as by modulating the current supply to a laser diode array, and/or by providing any other suitable means effective to modulate the output beam. The modulator means could, for example, take the form of electro-optic, magneto-optic, or acousto-optic modulators or LCD elements provided at the output end of the fibre. In printing and other forms of data recording, modulation of the light source is microprocessor controlled.

In a preferred and especially advantageous embodiment, the fibre laser comprises a central lasing core surrounded by a pump core of lower refractive index which, in turn, is surrounded by an outer cladding of still lower refractive index (the pump core providing the cladding for the lasing core).

In such a fibre laser, the pump core may be a multimode core of relatively large diameter and high numerical aperture. This allows efficient coupling of the pump light, from, for example, a number of laser diodes, into the pump core. The lasing core is effectively side-pumped as the pump light travels up and down the length of the fibre, trapped within the pump core, and, as end-pumping of the lasing core is of little or no importance, the dimensions of the lasing core may be optimised for data recordal. Thus, the lasing core may have a small diameter and low numerical aperture, so that the output beam from the fibre laser will also be of low numerical aperture and small diameter. This allows physically small, low numerical aperture, and, therefore, low-cost beam delivery optics to be used.

In a still further embodiment, the lasing core may be dimensioned to be narrow enough to sustain only a single transverse mode of the laser beam. This allows the output beam to be focused to its smallest possible spot size, which makes the source particularly suitable for use in high-resolution printing and for storing data as densely as possible in a medium. Within this single mode limit, it is preferred for the lasing core diameter to be large enough to prevent excessive diffraction divergence of the laser beam as it emerges from the lasing core.

The preferred embodiments of the invention are all capable of providing high radiance beams of small diameter and low numerical aperture, which are directly delivered to a recording medium without degradation in beam quality.

Although the use of a fibre laser in printing has been emphasised, the invention also relates to other kinds of data-recordal, such as on compact discs, where pits are etched onto the disc surface, or the magnetic field orientation of pixel elements of a material are altered.

From a second aspect, the invention also extends to a method of recording data, in which a laser beam from a fibre laser is used to effect data recordal, it being preferred to use a dual-core fibre laser producing a single transverse mode beam, with the fibre end-pumped by an array of laser diodes.

BRIEF DESCRIPTION OF THE DRAWINGS

Embodiments of the present invention will now be described, by way of example only, with reference to the accompanying drawings, in which.

DESCRIPTION OF THE DISCLOSED EMBODIMENTS

Figure 1:
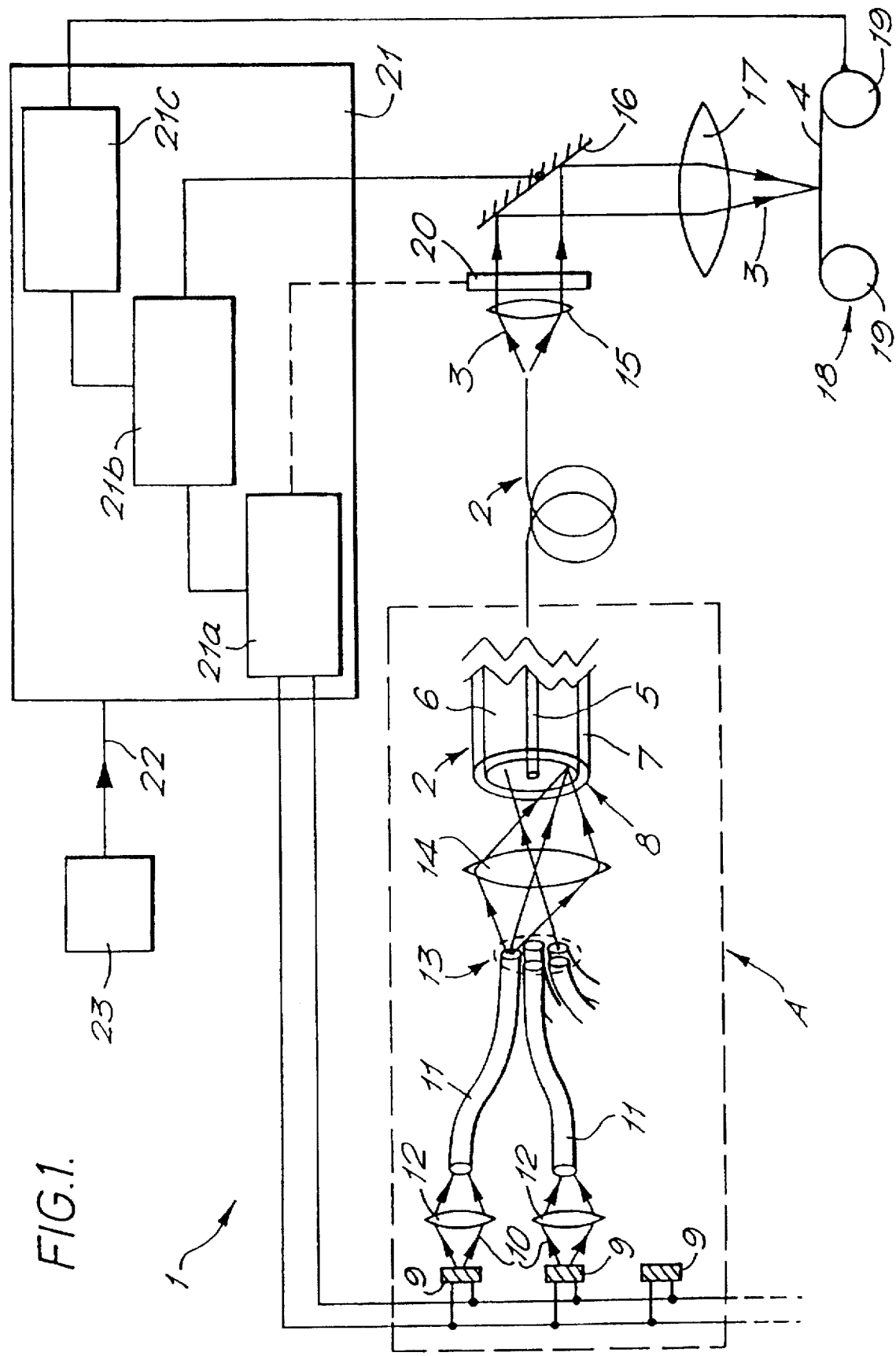
FIG. 1 is a schematic diagram of printing apparatus in accordance with a first embodiment of the invention.

Referring to FIG. 1, printing apparatus 1 includes a fibre laser 2, which outputs a laser beam 3. To effect printing, the beam 3 is scanned across the width of a print medium 4, such as a dye donor ribbon, and modulated to heat/activate selected pixel areas over which the beam 3 passes. Dashed Box A shows the fibre laser construction and pump details.

Fibre laser 2 comprises an inner lasing core 5 doped with a suitable material such as neodymium, an outer pump core 6 of lower refractive index and an outer cladding 7 of still lower refractive index. Dichroic mirrors 8 are provided at each end of the laser fibre 2 to provide a resonant cavity for laser action, and to reflect the pump light back and forth. The input mirror allows pump light in, whilst the output mirror allows laser light out.

An array of laser diodes 9 comprises the pump source. The output beams 10 from the laser diodes 9 are coupled into respective delivery fibres 11 by lenses 12 and the fibres 11 are bundled together at their output ends 13 to physically allow all of the beams 10 to be coupled into the fibre laser pump core 6 by a suitable imaging lens 14.

A power requirement for printing may be about 5 watts, and, with a conversion efficiency in the fibre laser of 30–50%, a pump power of about 10–16W is required. In order to meet this power requirement, therefore, the output from, for example, ten 1W laser diodes is needed, and, as two laser diode beams may be coupled, by means known to those in the art, into a single optical fibre, five delivery optical fibres, typically, may be coupled to the pump core 6.

Figure 2:
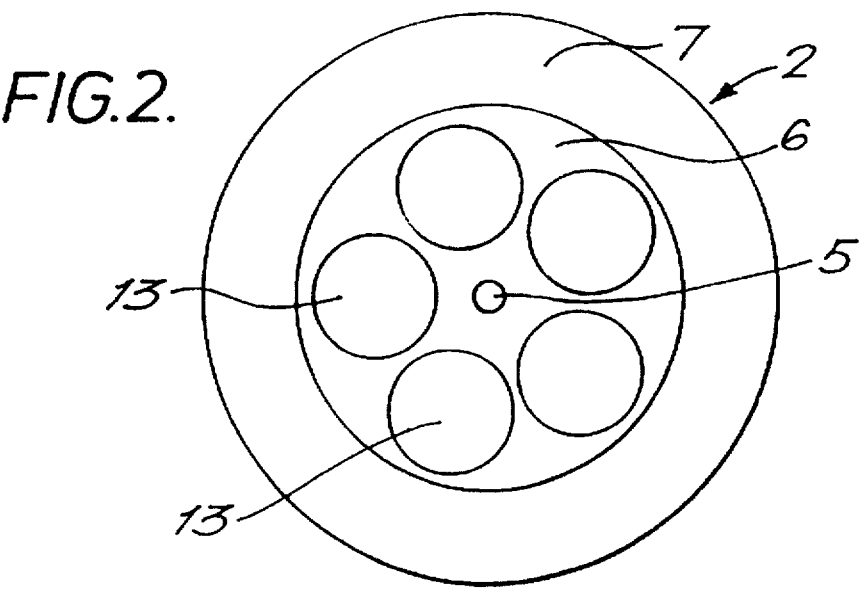
FIG. 2 is a diagram showing the multiple fibre pump input geometry of the apparatus of FIG. 1.

The geometry for this coupling is shown in FIG. 2, in which the output ends 13 of the five delivery optical fibres 11 are shown superimposed on the input end of the fibre laser 2.

To ensure optimum coupling of the laser diode beams 10 into the fibres 11, the latter have a numerical aperture of about 0.35 NA, and, similarly, the pump core 6 also has a numerical aperture of about 0.35 NA. Further, the pump core diameter will be in the region of 0.2 to 1 mm to accept the multiple delivery fibres focused onto its input end.

The pump light 10 is launched into the fibre laser pump core 6, and absorbed into the lasing core 5. The pump light 10 is substantially confined within the pump core 6, with little sideways loss, and is reflected back and forth along the fibre laser's length by the mirrors 8. This results in high pump efficiency, as the length over which the pump light is able to be absorbed is long.

As the lasing core 5 is effectively side-pumped, no restrictions are placed on it by the pump source, and so its dimensions may be optimised for data recording and printing. Accordingly, the lasing core 5 has a diameter of about 10μ or less to ensure that only a single transverse laser mode is sustained. This allows the output beam 3 to be focused to its smallest spot size. The lasing core diameter is kept high within this limit, though, to ensure that the beam 3 is not diffracted too greatly on emerging from the fibre laser's end.

The length of the fibre laser 2 may be between 0.1 and 10 m, and is chosen to achieve optimum coupling of the pump light 10 into the lasing core without making the fibre laser 2 excessively long or bulky.

The laser beam 3 outputted from the fibre laser 2 is collimated by input collimator lens 15, which is, typically, an F2.5, 20 mm focal length lens of 10 mm diameter, and which produces an 8 mm collimated beam.

The collimated beam 3 is scanned across the width of a print medium 4 through an angle of about ±30° by a galvanometer mirror 16, and is focused onto the medium 4 by an F25, 200 mm focal length, flat field lens 17, which adapts the focus of the scanned beam to lie on a flat plane, instead of a curved one.

The medium 4 is moved in a direction transverse to the scanning beam 3 by transport means 18, such as feed and take-up spools 19. An image is printed line-by-line as the medium 4 moves passed the scanning beam 3.

To produce a desired image, the beam 3 must be suitably modulated so that it only heats selected pixel elements as it scans across the medium 4. This may be accomplished by simultaneous synchronised current modulation of the laser diodes 9, and/or by a modulator 20, such as an acousto-optic modulator, provided in the path of the output beam 3.

A microprocessor 21, having pixel data means 21a, line generator means 21b and frame generator means 21c, may be used to synchronise the beam scan, medium transport and modulation, and to control the modulation on the basis of control signals 22 from, for example, video equipment or an electronic still camera 23.

Figure 3:
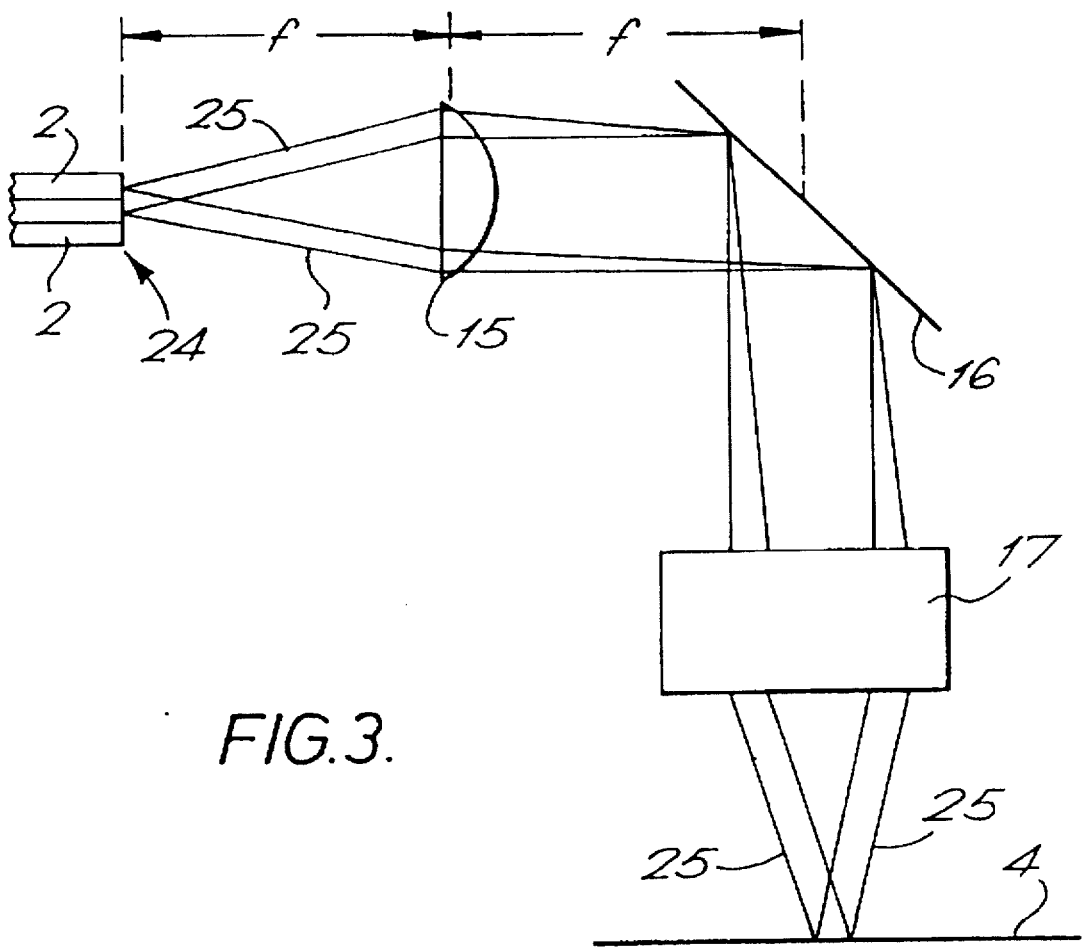
FIG. 3 is a diagram of the transfer and scanning optics of a second embodiment of the invention.

As an alternative embodiment to that of a single fibre laser 2, and as shown in FIG. 3, a number of fibre lasers 2 may be bundled together at their output ends to produce a fibre laser array 24. The fibre laser output beams 25 from this array 24 may be scanned in the same manner as the single output beam 3 in the first embodiment, and the optical elements are referenced the same.

If the array 24 is large, for example, 5 mm side-to-side, the galvanometer mirror 16 is best placed as near as possible to the rear focal plane of the input collimating lens 15, where the beams 25 have their smallest footprint. This allows the size, and so mass, of the mirror 16 to be minimised. Taking the lens 15 as in the first embodiment, the rear focal plane would be 20 mm behind the lens 15, and if, for some reason, it is not possible to position the mirror 16 this close, then a pupil relay system (not shown) in the form of, for example, a unity magnification afocal telescope may be used to relay this minimum footprint pupil further away from the input collimator lens 15.

Figure 4:
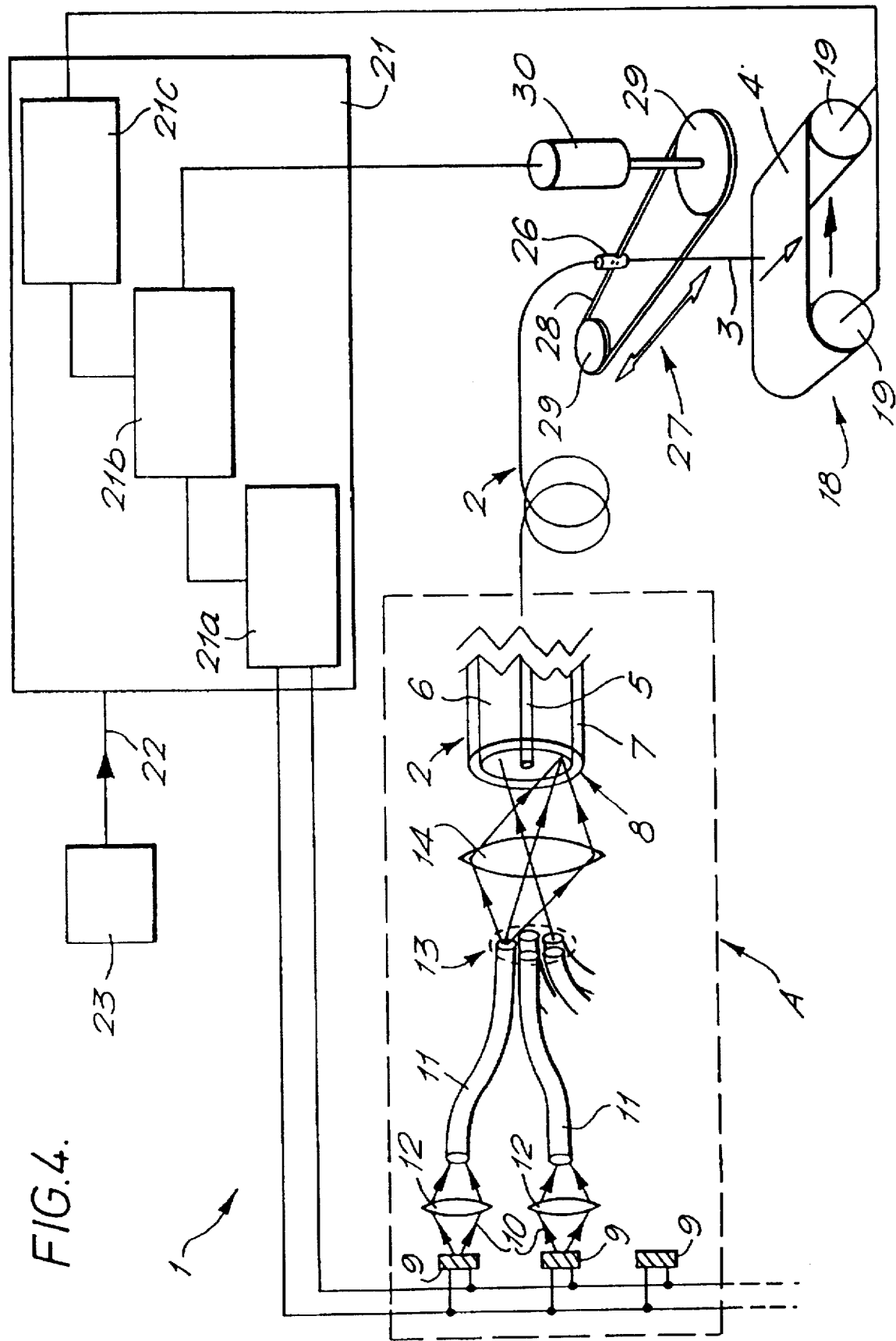
FIG. 4 is a schematic diagram of printing apparatus in accordance with a third embodiment of the invention.

A third embodiment of the invention is shown in FIG. 4, in which the optical scanning of the previous embodiments is replace by mechanical scanning. Apart from this, however, the apparatus is similar to that shown in FIG. 1, and like elements are referenced the same.

In this third embodiment, the fibre laser 2 is extended to face the print medium 4. A collimating and focusing optics unit 26 is mounted on the end of the fibre laser 2, and a mechanical scanning means 27 is provided comprising a transport band 28 tensioned about a pair of pulleys 29, one of which is driven by a motor 30. The fibre laser 2 is mounted to the band 26 via the optical unit 26, and reciprocated back and forth by clockwise and anti-clockwise activation of the motor 30. As the fibre laser 2 reciprocates, the output beam 3 scans across the print medium 4, and is modulated by current modulation of the laser diodes 9 and/or by a modulator (not shown) housed within the optical unit 26.

No expensive flat-field focusing optics (see 17 in FIG. 1) are needed in this embodiment, as the output beam 2 scans in a flat plane. Moreover, the optical elements in the unit 26 do not need to be as large as those in FIG. 1, since they need not extend over a beam's scan range.

Figure 5:
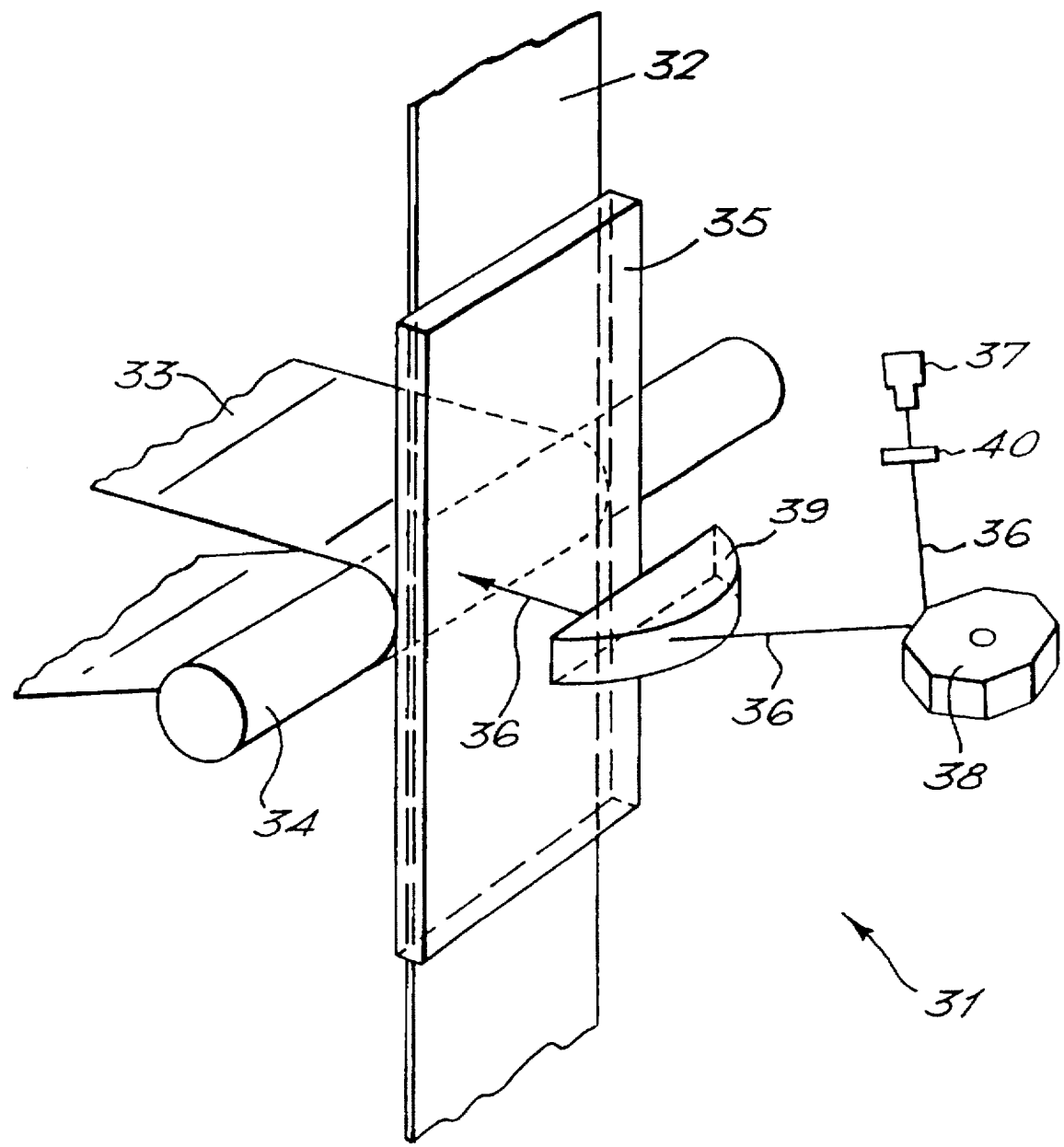
FIG. 5 is a schematic diagram of a further embodiment of the invention.

Referring to FIG. 5, a still further dye thermal transfer printing apparatus 31 is shown, in which a receiver ribbon 32 and a dye donor ribbon 33 are fed between the nip of a pressure roller 34 and a support plate 35. The receiver ribbon 32 comprises a dye receiver layer on a supporting substrate, whilst donor ribbon 33 comprises a dye layer (of dye and laser light absorbing material dispersed in a binder) on a supporting substrate.

The support plate 35 and receiver ribbon 32 are transparent to laser light 36 from a fibre laser source 37. The laser light 36 is scanned across the dye donor ribbon 33 by a rotating polygon mirror 38, and a flat field lens 39 is provided between the polygon 38 and a support plate 35 to ensure that the laser light 36 is scanned across the dye donor ribbon in a flat focal plane rather than a curved one.

The laser light 36 from fibre laser 37 is pulsed by an acousto-optic modulator 40 as the polygon 38 scans the light 36 across the donor ribbon 33, and the laser pulses are synchronised with the rotation of the polygon 38, so that each pulse heats a selected pixel region of the donor ribbon 33 lying along the scan line. Thus, as the donor ribbon 33 and receiver ribbon 32 are moved past the roller 34, a printed image is produced pixel-line-by-pixel-line in the receiver layer of the receiver ribbon 32.

EXAMPLE

In order to illustrate the invention, a dyesheet was prepared, sensitive to a Nd doped fibre laser source (1060 nm). Its formulation is below:

| Absorber layer: | |
| --- | --- |
| Cellulose Acetate Phthalate (ex Eastman Kodak) | 2.8 g |
| Cymel 303 (ex American Cyanamid) | 0.28 g |
| p-Toluenesulphonic acid catalyst | 0.14 g |
| 1-methoxy-2-propanol | 12.6 g |
| Methanol | 5.25 g |
| Methyl ethyl Ketone | 8.75 g |
| IRA** (dissolved in 44 g Methylene chloride) | 1 g |
| Dye layer: | |
| UDEL (ex Union Carbide) | 40 g |
| Magenta Dye* | 25 g |
| Methylene Chloride | 500 g |

*Magenta dye used: N-2-acetoxyethyl-4-(4-cyano-3-methylisoathiazol-5-ylazo)-N-ethyl-3-methylaniline:

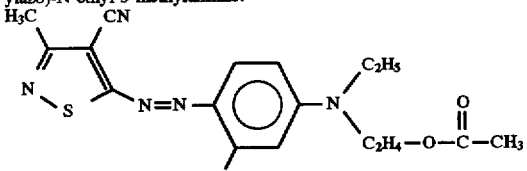

**IR Absorber used: N-tetra-n-butylammonium bis-(mercaptonapthol) nickel:

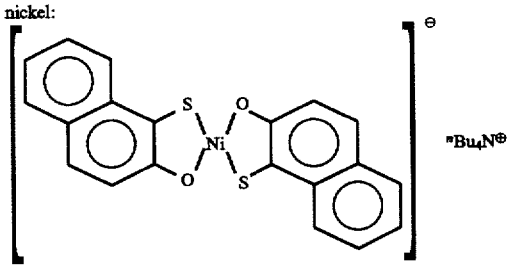

The coatings were laid down using a meyer bar onto 23 μm S grade Melinex (ICI) PET film, the absorber coatings in each case were cured at 100° C. for 5 minutes before the dye layer was coated over the top. The resulting adsorption properties of the dyesheet so produced were as follows:

| $OD_{560\,nm}$ | $OD_{820\,nm}$ | $OD_{1060\,nm}$ |
|---|---|---|
| 3.8 | | 0.3 |

A receiver sheet, comprising a dye compatible coating on transparent O grade Melinex (ICI), and the dyesheet were held against an arc to retain laser focus by the application of 1 atm pressure, as in FIG. 5. An Nd doped double clad fibre laser was used, such as is described by Minelly et al in the 1991 Research Review from the University of Southampton and University College London Optoelectronics Research Centre. This fibre laser, when fed with a pump power of 500 mW at 808 nm, provides about 150 mW of 1.06 µm single mode laser radiation. After passage through the optical system, about 75 mW of power is available as a 25 µm diameter beam, modulated by the acousto-optic modulator, and this is scanned across the media via the galvanometer scanner to print blocks of magenta on the receiver.

The energy is substantially absorbed by the IR absorbing layer, which heats the film and allows dye to transfer from the dyesheet to the receiver. By varying the pulse time, different optical densities are obtained on a continuous-tone basis, with a pulse time of 30 µs corresponding to a print OD of about 1.0.

The above embodiments are only specific examples of the present invention, and many variations may be envisaged. For example, the fibre laser in the third embodiment could be replaced by a plurality of fibre lasers bundled together to form an array, and, in all of the embodiments, instead of using the imaging lens 14 to launch the pump light 10 into the pump core 6, the delivery fibres 11 could be butt coupled to the input end of the pump core 6. Also, it is not necessary to have dichroic mirrors 8 at both ends of the fibre laser, and there may only be one, at the input end, or even none. Further, other methods and means may be employed to modulate the fibre laser output, and the fibre laser need not be of the dual core type. The fibre laser could be pumped by a single laser diode, instead of an array, if power requirements permit, and, indeed, other suitable pump means apart from laser diodes could be used.

We claim:

1. Data recordal apparatus comprising:
   a fibre laser, said fibre laser having a lasing core and an outer cladding, said fibre laser having a pair of opposite ends, said lasing core being doped by a material suitable for causing laser action;
   pumping means for stimulating laser action in said fibre laser core whereby said laser generates laser light, said laser light being emitted as a beam; and
   means for directing laser light emitted from said fibre laser onto a recording medium to cause localized changes in the state thereof whereby data may be recorded on said medium.

2. Apparatus according to claim 1 wherein said pumping means comprises a pump core surrounding said lasing core, said outer cladding surrounding said pump core.

3. Apparatus according to claim 1, wherein said pumping means comprises at least one laser diode.

4. Apparatus according to claim 1, wherein said fibre laser is held stationary and wherein said directing means comprises optical means for scanning the emitted laser light beam across the recording medium.

5. Apparatus according to claim 1, wherein one of said ends of said fibre laser is an output end through which the laser light is emitted, and wherein said directing means comprises a means movably mounting said fibre laser output end, said movable mounting means causing movement of said fibre laser output end to thereby scan the beam of laser light emitted from said fibre laser across the recording medium.

6. Apparatus according to claim 1, wherein said data-recordal apparatus comprises a plurality of said fibre lasers, each of said lasers having an output end through which the beam of coherent light is emitted, a said pumping means being associated with each of said fibre lasers of said plurality, and wherein said output ends of said fibre lasers are collected together into a bundle.

7. A method of data recordal comprising the steps of:
   providing at least a first fibre laser having a core and an outer cladding, the core of said laser being doped by a material suitable for causing lasing action;
   pumping said fibre laser to cause said laser to generate a beam of coherent light; and
   directing the light beam from said fibre laser onto a recording medium.

8. Apparatus according to claim 1, wherein said lasing core is doped with neodymium.

9. Apparatus according to claim 2, wherein the pump core is a multimode core.

10. Apparatus according to claim 1, wherein the lasing core is dimensioned so as to sustain only a single transverse mode of the laser light.

11. Apparatus according to claim 1, wherein the fibre laser is end-pumped.

12. Apparatus according to claim 5, wherein focusing optics are mounted on the output end of the fibre laser.

13. Apparatus according to claim 6, wherein said fibre laser output ends are bundled together in a two dimensional array.

14. The apparatus of claim 1, wherein the data-recordal is accomplished by thermal transfer printing.

15. The apparatus of claim 1, wherein the data-recordal is accomplished by dye thermal transfer printing.

16. The apparatus of claim 1, wherein the data-recordal is accomplished by dye diffusion thermal transfer printing.

17. Apparatus according to claim 8, wherein the pump core is a multimode core.

18. Apparatus according to claim 17, wherein the lasing core is dimensioned so as to sustain only a single transverse mode of the laser light.

19. Apparatus according to claim 18, wherein the fibre laser is end-pumped.

20. Apparatus according to claim 19, wherein one or more laser diodes are used to pump the fibre laser.

* * * * *